United States Patent [19]
Kaye et al.

[11] 3,823,367
[45] July 9, 1974

[54] BATTERY PACKAGE WITH END OF LIFE CONDITION INDICATOR
[75] Inventors: Gordon E. Kaye, Garrison; George Sussingham, Mount Vernon, both of N.Y.
[73] Assignee: P. R. Mallory & Co. Inc., Indianapolis, Ind.
[22] Filed: Sept. 4, 1973
[21] Appl. No.: 393,766

[52] U.S. Cl. .............................. 324/29.5, 136/182
[51] Int. Cl. .................... H01m 31/04, G01n 27/42
[58] Field of Search .................... 324/29.5; 136/182

[56] References Cited
UNITED STATES PATENTS

| | | | |
|---|---|---|---|
| 1,202,078 | 10/1916 | Luthy | 324/29.5 |
| 2,155,778 | 4/1939 | Stratton | 324/51 |
| 2,654,865 | 10/1953 | Klug | 324/106 |
| 3,401,337 | 9/1968 | Beusman et al. | 324/29.5 X |

Primary Examiner—Alfred E. Smith
Assistant Examiner—Rolf Hille
Attorney, Agent, or Firm—Robert Levine

[57] ABSTRACT

A battery pack for small portable and hand-operable devices, arranged to be detent-locked in operating position so long as the battery voltage exceeds minimum satisfactory operating value for the device and to be released and ejected, partially for visible indication, when battery voltage drops below minimum satisfactory operating value.

10 Claims, 7 Drawing Figures

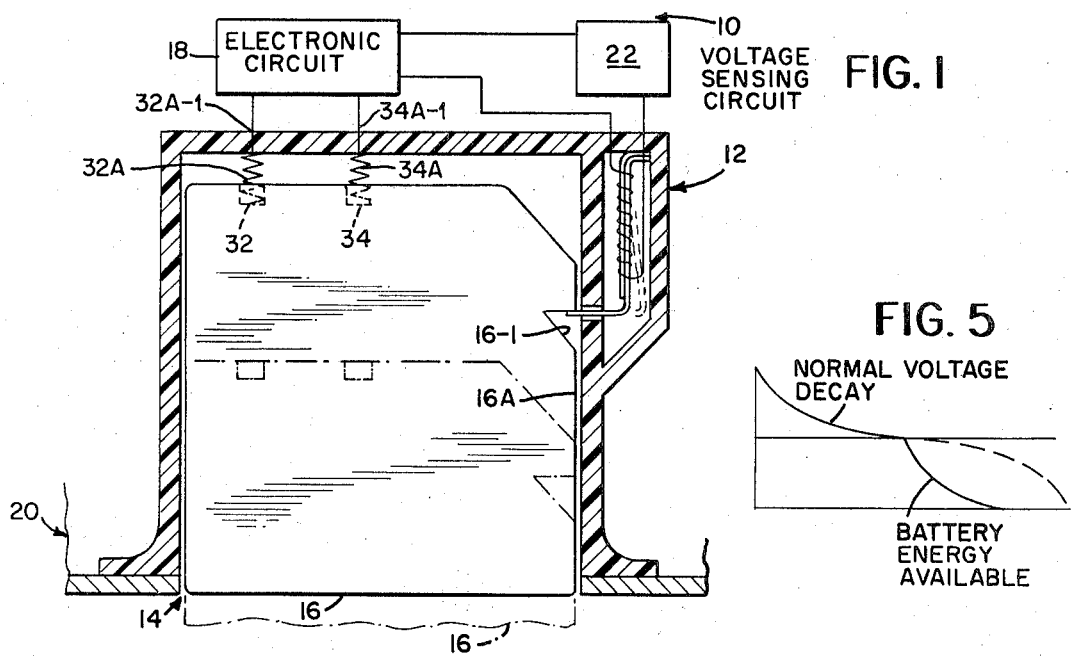
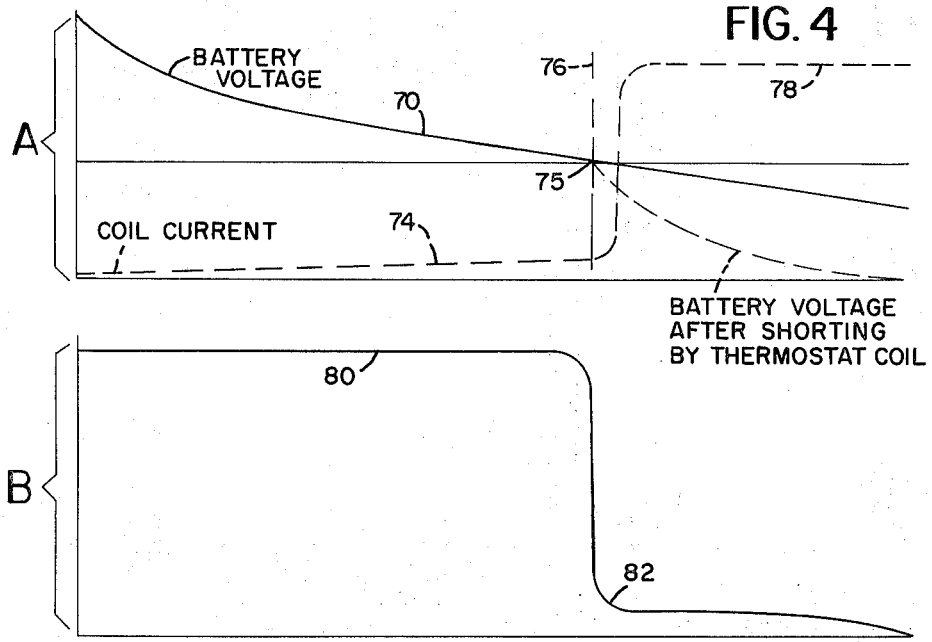
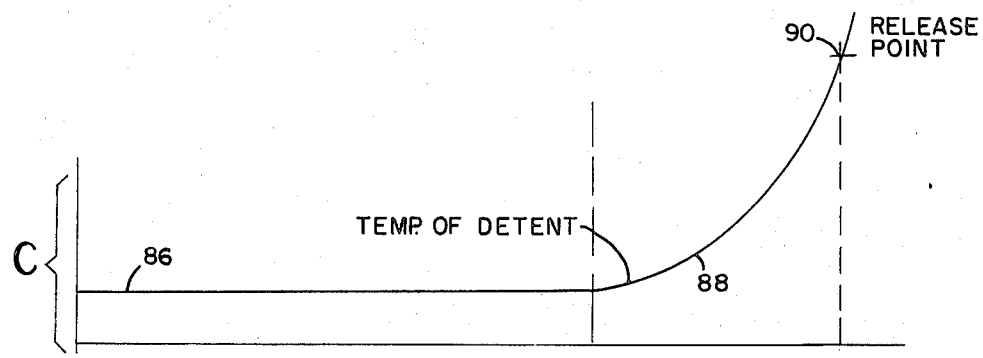

BATTERY PACKAGE WITH END OF LIFE CONDITION INDICATOR

This invention relates to life-condition indicators for electric batteries to be used with small portable devices, such as pocket radios, pocket computers, and similar devices, in which a small battery is utilized to energize the device; the invention is particularly directed to a system for indicating when the battery voltage or energy content drops to a value that makes the battery unsuitable for further use; and the invention further contemplates a direct physical indication, symbolic of rejection, by actually displacing the battery and partially ejecting it from its normal position of assembly in the associated device.

In the operation of small portable devices that utilize batteries, one troublesome feature is that the battery voltage or energy content may be reduced to a low level insufficient for normal proper operation, without some suitable indication to the owner or user that such condition has been reached.

In the case of a radio set, such condition is not too serious since it results in merely temporary inconvenience to the user, and the ineffectiveness of the batteries is indicated by the failure to produce sound at the level desired.

In the case of the small pocket type computer, however, where some reliance is placed upon the correctness of the indicated computations, the loss of battery voltage, or inadequate battery voltage, could produce inaccurate results without the user being aware of the fact that the battery voltage was too low to perform properly. In the case of such a device there is no indication of an operating condition that would alert the user to the fact that the battery voltage was inadequate to enable the computer to perform correctly.

The use of a simple meter element would suggest itself as an obvious solution to this problem, but such a solution would introduce many other problems. Such a meter instrument would be expensive, at best, and would require considerable space in the small unit which is being considered here; and would require periodic calibration in view of the general shock forces that would be applied to the device in the normal handling and manipulation. Suffice it to say that such a solution, apparently obvious and simple, would be unsatisfactory.

Engineering analysis dictates that a rugged detector is required. Further, to provide a simple economical solution to this problem, to indicate the inadequate condition of the battery, this invention provides for using the battery itself as an indicator; and provides such indication by partially ejecting the battery from its normal operating position in the assembly, so that the indication of battery inadequacy is given immediately and directly to the user.

Thus, the primary object of this invention is to provide indication of battery inadequacy, or end-of-life condition, by displacing the battery from its normal operating position in the working assembly, so the shifted position of the battery will directly notify the user that the battery is no longer suitable for service and that a substitution must be made.

Another object of the invention is to provide a control assembly whereby the battery is inserted into its working position and there held latched in position, with means provided to unlatch and release the battery and partially eject the battery from its normal position, when the battery voltage drops to or below a suitable operating voltage.

Another object of the invention is to provide a battery control arrangement in which a battery is inserted into a predesigned pocket to engage compression springs at its terminals, with a suitable latch to engage a notch formed on the battery case to lock the case in position during normal voltage conditions; and when the battery voltage drops to or below a minimum operating value the otherwise unavailable remaining energy of the battery is utilized in a short circuit operation, to heat and energize a bi-metal detent to release the battery, whereupon the compressed terminal springs displace the battery to a partially ejected condition, which becomes immediately apparent to the user and serves thereby as an indication that the battery has reached the end of its operating life.

In accordance with the principles of this invention, a battery case is shaped to be insertable into a predesigned pocket formed in the case of the device with which the battery is to be used. The battery terminals will engage a pair of unstressed helical springs in the pocket that serve as receiving terminals for the circuitry of the device, and, when the battery is pressed home into the pocket, which represents operating position, the receiving terminal springs are compressed to store energy and to tend to push the battery case back out, but the battery case is held in such operative position by a detent finger, that reaches into a detent slot in the side of the battery case to hold the battery case against outward displacement by the terminal compression springs. The detent finger, that normally holds the battery against ejection, is mounted at the end of a cantilever-supported bimetal spring, and that finger serves as a detent as long as the bi-metal spring is at normal ambient temperature. A heating coil for the bi-metal is normally not energized, but becomes energized from the battery, through a voltage sensing transistor, when the battery voltage drops to a value insufficient to operate the associated device. There is still, however, sufficient residue or unusable energy remaining in the battery, and that residue energy is then directed by the transistor to energize the heating coil on the bi-metal strip, sufficiently to cause the strip to bend as a cantilever, to move the restraining detent finger from the detent slot of the battery case. Thereupon, the compressed terminal springs operate to move the battery case to a position of partial ejection from its pocket. That partially ejected position of the battery serves to indicate that the battery has reached its end-of-life condition and must be replaced.

One preferred embodiment is described in the following specification, together with the accompanying drawings, in which FIG. 1 shows a front view in elevation of a housing and pocket for receiving a battery, with a front cover wall removed from the housing to show the pocket for receiving and supporting a battery pack;

FIG. 4(A) shows the battery voltage graph;

Figure 3:
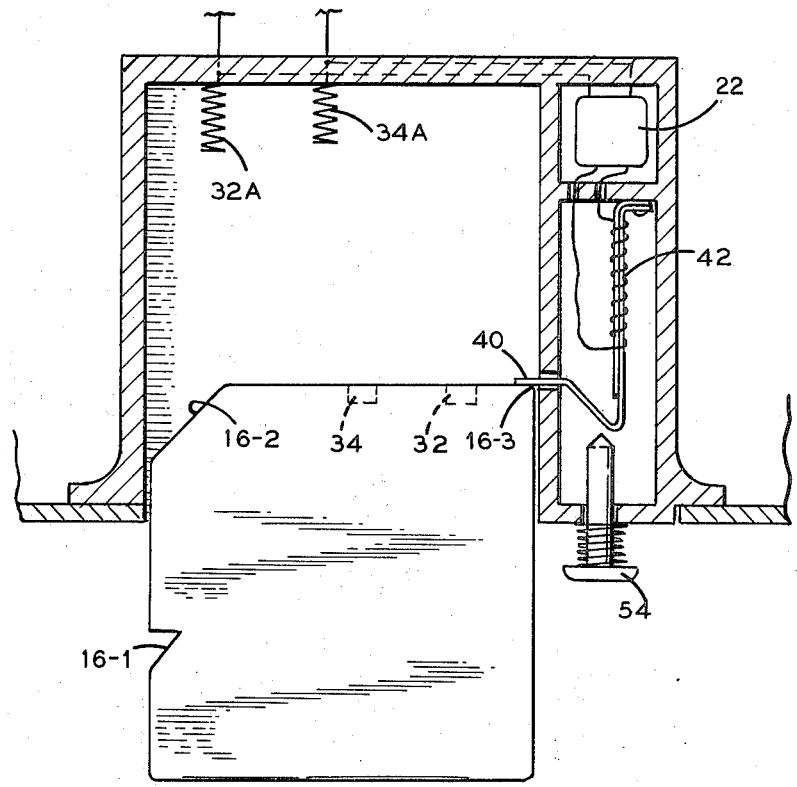
FIG. 3 shows a view similar to FIG. 2, and shows how the detent latch cooperates with a square corner of the battery case to prevent improper insertion of the battery case.

4(B) shows the transistor and heating coil current; and

4(C) shows the heating effect on the bi-metal strip;

FIG. 5 shows the battery energy available to energize the end of life condition detector, when the battery voltage drops below the minimum satisfactory operating value necessary to energize the battery operated electronic device.

As shown in FIG. 1, a combination battery package and receptacle as an ejectable battery is shown in a housing 12, enclosing and defining a hole or space chamber 14, for receiving a battery 16, to energize an electronic circuit 18, associated with the device 20, such as a camera or an electronic calculator, containing an electromechanical device in the electronic circuit 18, which is to be operated by the battery 16. This device differs from radio sets in which the gradual deterioration of the battery can be sensed aurally, in such way that the end-of-life condition of the battery is signalled to a user, so that appropriate steps can be taken to substitute a new battery before the end-of-life condition of the battery can cause embarrassment.

However, in the case of a camera, the end of the effective life of a battery may be reached before the camera operator is aware of the nonoperating condition. The operator may then not be in a position to obtain batteries conveniently.

In the case of electronic calculators, a drop in battery voltage, to less than minimum effective operating voltage, might cause errors without any appropriate signal that would indicate the need for new batteries.

Thus the electronic circuit 18 for operating the device, whether it be a camera or a calculator, will operate properly as long as the battery voltage is above a minimum effective value, but in the case of a calculator, the operation may become erratic without indicating that the fault is due to low voltage in the battery.

In order to obtain a sensing indication of the battery condition, a sensing circuit 22 is employed to provide continuous supervision of the battery voltage. As long as the battery voltage is sufficient to operate the battery circuit 18, the battery 16 will be permitted to remain connected to the electronic circuit 18. However when the voltage of the battery drops to, or below, a minimum value, the sensing circuit 22 will function to separate the battery from the electronic circuit, and to provide an indication to the user that the battery has reached the end of its life.

Instead of resorting to a voltage measurement meter to show the continuous value of the voltage of the battery, this invention proceeds on a different philosophy.

A voltage indicating meter, for example, would have many disadvantages. It would be expensive; it would require possibly frequent recalibrations; at the low voltages employed in the small portable equipment, sensitivity required of the instrument would make it quite expensive and difficult to keep calibrated. All in all, these disadvantages weigh heavily against a voltage-indicating instrument for these small portable devices.

In accordance with the principles of this invention, a positive indication is provided, that does not require the continual attention of the user. When the voltage of the battery drops to an ineffective value, indicating end-of-life condition has been reached for the battery, the system functions to eject the battery from its normal operating position, and that signal to the user is the most effective kind of signal that can be given.

In accordance with the principle of this invention, the battery case is constructed to carry two battery terminals 32 and 34 at specific locations that will cause those battery terminals to engage two fixed terminals 32A and 34A, also specifically located, that are electrically connected to the bus conductors 32A-1 and 34A-1 that lead to the electronic circuit 18.

The two stationary terminals 32A and 34A, of the electronic circuit and equipment 18, are formed as helically-wound spiral conical springs that will engage the terminals of the battery 16 and be compressed when the battery case 16 is moved into operating position. As will be evident to those skilled in the art, spring terminals 32A and 34A may be affixed to the wall of chamber 14 by any conventional method, such as by bonding, riveting or molding.

The two spring terminals 32A and 34A thus serve two purposes; first, as terminals to establish electrical connection between the battery and the electronic circuit of the equipment, and second, to store energy of compression for ejecting the battery case, later, when the voltage of the battery drops to a predetermined voltage at which the battery will be no longer able to function effectively.

In order to hold the battery latched in place against the stored ejection force of springs 32A and 34A, the battery case is formed with a notch 16-1 in one side wall 16A of the battery case.

The battery case is then held in its forward position by a latching detent 40 which is resiliently supported on a resilient strip 42 of bi-metal, which will later serve the purpose of withdrawing the latch 40 from the detent groove 16-1, when the cell voltage is no longer sufficient to operate the device 18 properly.

Figure 2:
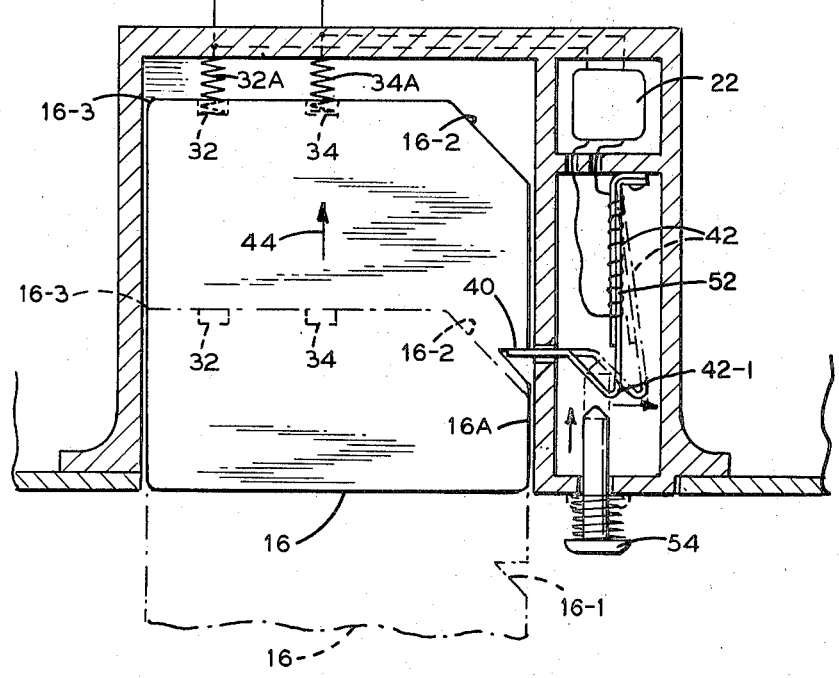
FIG. 2 shows a schematic perspective view of the battery case, and illustrates the location of the battery engaging spring contacts; and shows also a detent slot in the battery case, and a corner bevel on the case; and indicates partial ejection in broken line.

At this time, it may be noted, upon reference to FIG. 2, that the top right hand corner of the battery case 16 is bevelled at the corner 16-2, so that the battery case 16 can be inserted directly, in the direction of the arrow 44, into its proper operating position; and, during such forward insertion of the battery, the bevelled corner 16-2 will slide freely past the latch 40, while pushing that latch 40 backward to the right hand side in FIG. 2 against the resilient support 42, as the battery case 16 is moved progressively forward to its ultimate resting position against the spring terminals 32A and 34A.

It will be seen upon reference to FIG. 3, in comparison with FIG. 2, that upon the attempted improper insertion of the battery, as shown in FIG. 3, the square corner 16-3 of the battery case, in such wrong position, will strike against the latch 40 that extends into the battery chamber 14, and the battery will therefore not be permitted to enter that chamber, until its position is reversed to correspond to that shown in FIG. 2. Thus, by means of that square corner 16-3 on one side, and the bevelled corner 16-2, on the other side, of the battery case 16, in cooperation with the detenting latch 40 extending into the receiving space for the battery case, correct and proper insertion of the battery is compelled and assured.

Thus the proper insertion of the battery is required, so that the battery is properly connected to the stationary receiving circuit terminals, for the electronic circuit 18 of the equipment, and for proper positioning with respect to the detenting latch 40, that will hold the battery in correct position during normal operation and during normal voltage condition in the battery.

When the battery voltage drops, the battery will be released and ejected. For that purpose, the releasing and ejecting equipment includes a bi-metal strip 42 supported as a cantilever whose lower free end 42-1 is formed as a loop to serve two purposes. The first and principal purpose of the loop 42-1 is to resiliently support and control the detent latch 40. The second function of the loop 42-1 is to serve as a cam, by means of which the releasing function of the detent latch 40 may also be manually controlled by a manually operable button 54, to move the cantilever bi-metal strip 42 to withdraw the latch 40 from the detent groove 16-1 in the battery case 16.

The primary function of the bi-metal strip 42 is to be performed automatically. When the battery is inserted properly as shown in FIG. 2, the resilient cantilever strip 42 is forced backward by the action of the inclined corner 16-2 of the battery case on the detenting latch 40, which is readily accomplished in view of the flexibility and resilience of the bi-metal strip 42. When the battery reaches its home position, the resilient strip 42 then moves the detent latch 40 back into its normal position, where it extends into the detent groove 16-1 of the battery case and holds the battery case locked in its maximum forward internal position, against the compression forces of the two terminal springs 32A and 34A.

In order to operate the bi-metal spring to release the battery when such action is appropriate, a heating coil 52 is provided in electrically insulated but thermally conductive condition on the bi-metal strip 42, so the heating coil 52, when appropriately energized through the sensing and control circuitry 22, will heat the bi-metal strip 42 and cause it to bend and to move its free end in the direction that will withdraw the detent latch 40 from the detent groove 16-1 in the battery case. When that happens, the battery case 16 is free to move in response to the reaction pressure of the two terminal springs 32A and 34A, and the battery case 16 is then partially ejected from its compartment 14, and the projecting portion of the battery case is then visible as an ejected battery, so the user is thus given an immediate and direct signal that the battery is no longer capable of serving its function and must be replaced.

FIG. 2 shows schematically the battery position, projecting partly out of its compartment, to indicate that the battery is inoperative and needs replacement.

Such control of the detent heating coil is illustrated schematically in FIG. 2 in which a transistor, which is included in the voltage sensing circuit 22, is utilized to control the energization of the heating coil 52.

During normal voltage of the battery at, or above, the minimum operating value, the bias on the transistor controls the transistor as an open or high resistance relay or valve, so that it will not transmit any substantial energy to the heating coil during such normal voltages. At or below, minimum proper operating value, the bias shifts the transistor to low resistance in condition, which will serve as an immediate closed switch to connect the heating coil directly across the battery.

At that low voltage of the battery, the voltage is insufficient to operate electromechanical elements of the main device, but there is still sufficient residual energy in the battery, as graphically shown in FIG. 5, that is enough to heat the heating coil associated with the bi-metal strip, so that the strip will bend inward to remove the detenting latch 40 from the groove in the battery case, and thereby release the battery case for expulsion by the compressed terminal springs.

FIG. 4 (A) shows a graph of the battery voltage and indicates how the operation of the heating coil is controlled. While the battery voltage 70 is above the minimum operating value 75, the current 74, through the transistor and the heating coil 52, will be at a very low value that is insufficient to heat the bi-metal strip 42 to pull the detent latch 40 out of its detent slot. As shown by graphs 4A, 4B and 4C, when the battery voltage 70 drops to the minimum value 75, at the time represented by the vertical line 76, the bias on the transistor controls the transistor to full conducting condition, which places the heating coil 52 in substantially short circuit condition across the battery, so that the battery current immediately rises from the low ineffective value 74 to the value 78, at which the heating coil is energized to heat the bi-metal strip 42 sufficiently to cause that strip to bend and withdraw the detent latch 40.

In the graph in FIG. 4 (B), the change in resistance is indicated in the transistor, from a high resistance value 80 to a drop to low resistance 82, as the transistor bias is changed by reduction of the battery voltage to the point 75.

In graph FIG. 4(C), the temperature change is shown at a normal low value temperature 86, while the detent latch is effective, and increasing by a rise along curve 88 after the transistor changes to a closed condition, and the temperature then rises to a point 90 at which the detent latch 40 is withdrawn from the battery case, and the case is then released for ejection by the terminal springs 32A and 34A.

Thus, by means of the features and details of construction illustrated herein, the battery case can be easily inserted into proper operating position, with the assurance that the polarities of the battery are correct, and upon drop of the battery voltage to and below its minimum effective value, the battery will be ejected from the apparatus, to provide a direct or immediate signal to the user, that the apparatus is no longer functioning and that a new battery is required.

The design details of construction and their arrangement may be modified in various ways to embody these same features, without departing from the spirit and scope of the invention as defined in the claims.

What is claimed is:

1. A battery end-of-life condition detector, comprising, in combination:

a battery case adapted to hold several electrochemical cells;

an associated device to be energized by said battery case, said associated device having a housing embodying a receiving chamber for said battery case, said receiving chamber having an end wall and two side walls, one of said side walls having an aperture therein;

spring means affixed to the end wall of said receiving chamber to be mechanically energized by pressure of said battery case, to store energy in response to pressure of the battery case when moved into operative position in said device to be operated by said battery;

latching means extending through the aperture in the wall of said receiving chamber to releasably latch said battery case in operative position;

and means responsive to a predetermined voltage of the battery for controlling said latching means to release said battery case for movement by said spring means.

2. A battery condition detector, as in claim 1, in which said spring means serve also as receiving terminal contacts to be engaged by the battery terminals to supply energy to an electric circuit to operate said device.

3. A battery condition detector, as in claim 1, in which said latching means serves also to detect the insertion mode of the battery and permits complete insertion only if the battery is properly aligned for the detenting action.

4. A battery condition detector, as in claim 1, in which said latching means serves also to detect the insertion mode of the battery, and permits complete insertion only if the battery is properly aligned to engage the spring circuit terminals.

5. A battery condition detector, as in claim 1, in which said latching means includes (a) a detent finger to engage a detent slot in the battery case while the battery voltage is adequate for operation of said device; and (b) a retracting element to disengage said detent finger from said slot to release said battery case for expelling movement by said spring means when the battery voltage drops below minimum operating value.

6. A battery condition detector, as in claim 1, in which said means responsive to the battery voltage includes latch-releasing means and means for energizing said latch-releasing means.

7. A battery condition detector, as in claim 6, in which said latch-releasing means includes a thermally-responsive bimetal strip, and a heating coil for said strip, with means for energizing said heating coil from the residue battery energy after the battery voltage drops to a voltage value too low to be effective for the associated device.

8. A battery condition detector, as in claim 1, in which a blocking detent prevents insertion of the battery case to full operating position, if the case is inserted in wrong polarity position.

9. A battery condition detector, as in claim 8, in which the circuit to be energized by the battery includes a polarity-sensitive device, and said blocking detent compels insertion of the battery in proper position to achieve correct polarity disposition.

10. A battery condition detector, as in claim 7, wherein said means for energizing the latch-releasing means includes a transistor which is biased so that above a minimum operating battery voltage, current through the heating coil will be insufficient to heat the bi-metal strip, but at a voltage at or below the predetermined minimum operating voltage, the transistor will be in full conducting condition so that the battery current to the heating coil rises to heat the bi-metal strip, thereby bending and withdrawing the detent latch.

* * * * *